US009409197B2

(12) United States Patent
Gehrung

(10) Patent No.: US 9,409,197 B2
(45) Date of Patent: Aug. 9, 2016

(54) AIR NOZZLE CLOSURE FOR A SPRAY GUN

(71) Applicant: SATA GmbH & Co. KG, Kornwestheim (DE)

(72) Inventor: Ralf Gehrung, Stuttgart (DE)

(73) Assignee: SATA GmbH & Co. KG, Kornwestheim (DE)

( * ) Notice: Subject to any disclaimer, the term of this patent is extended or adjusted under 35 U.S.C. 154(b) by 0 days.

(21) Appl. No.: 14/572,998

(22) Filed: Dec. 17, 2014

(65) Prior Publication Data
US 2015/0165463 A1 Jun. 18, 2015

(30) Foreign Application Priority Data

Dec. 18, 2013 (DE) ...................... 20 2013 105 779 U

(51) Int. Cl.
B05B 1/28 (2006.01)
B05B 15/02 (2006.01)
B05B 15/06 (2006.01)
F16B 21/18 (2006.01)

(52) U.S. Cl.
CPC ............... *B05B 15/02* (2013.01); *B05B 15/065* (2013.01); *F16B 21/186* (2013.01)

(58) Field of Classification Search
CPC ...... B05B 15/02; B05B 15/06; B05B 15/065; B05B 3/1092; B05B 5/0426
USPC .......................................... 239/290, 291, 600
See application file for complete search history.

(56) References Cited

U.S. PATENT DOCUMENTS

| 40,433 A | 10/1863 | Sees |
| 327,260 A | 9/1885 | Hart |
| 459,432 A | 9/1891 | Anderson |
| 459,433 A | 9/1891 | Avery |
| 548,816 A | 10/1895 | Paul |

(Continued)

FOREIGN PATENT DOCUMENTS

| AT | 153883 | 6/1997 |
| AT | 163577 | 3/1998 |

(Continued)

OTHER PUBLICATIONS

International Search Report (dated Jun. 20, 2008), Written Opinion (dated Jun. 20, 2008), and International Preliminary Report on Patentability (dated Sep. 14, 2010) from PCT/US2008/03318 filed Mar. 12, 2008.

(Continued)

*Primary Examiner* — Davis Hwu
(74) *Attorney, Agent, or Firm* — Paul D. Bianco; Gary Winer; Fleit Gibbons Gutman Bongini & Bianco PL

(57) ABSTRACT

An air nozzle closure for a spray gun with an air cap, which has at least one axial borehole for the passage of exiting air and a first annular flange, which is radially directed outward, and an air nozzle ring surrounding the air cap, with a second annular flange radially directed inward, and an inside thread for the screwing on of the air nozzle closure with an outside thread of the spray gun. The air cap in the screwed state, with annular flanges adjacent to one another, is clamped in between the spray gun and the air nozzle ring, and a first annular groove with a locking ring, which secures the air nozzle ring in the unscrewed state against the loosening of the air cap. The locking ring has at least one elastic snap-in element projecting inward to snap into the annular groove.

11 Claims, 3 Drawing Sheets

(56) References Cited

U.S. PATENT DOCUMENTS

| | | |
|---|---|---|
| 552,213 A | 12/1895 | Troy |
| 552,715 A | 1/1896 | Lugrin |
| 563,505 A | 7/1896 | McCornack |
| 581,107 A | 4/1897 | Emery |
| 644,803 A | 3/1900 | Justi |
| 672,012 A | 4/1901 | Ruper |
| 574,880 A | 5/1901 | Schmidt et al. |
| 1,662,496 A | 3/1928 | Forsgard |
| 1,703,383 A | 2/1929 | Birkenmaier |
| 1,703,384 A | 2/1929 | Birkenmaier |
| 1,711,221 A | 4/1929 | Blakeslee |
| 1,751,787 A | 3/1930 | Binks |
| 1,889,201 A | 11/1932 | Holveck |
| 2,008,381 A | 7/1935 | Beeg |
| 2,049,700 A | 8/1936 | Gustafsson |
| 2,051,210 A | 8/1936 | Gustafsson |
| 2,070,696 A | 2/1937 | Tracy |
| 2,116,036 A | 5/1938 | Money |
| 2,125,445 A | 8/1938 | Holveck |
| 2,198,441 A | 4/1940 | Mollart |
| 2,204,599 A | 6/1940 | Jenkins |
| 2,269,057 A | 1/1942 | Jenkins |
| D133,223 S | 7/1942 | Tammen |
| 2,356,865 A | 8/1944 | Mason |
| 2,416,856 A | 3/1947 | Thomsen |
| 2,416,923 A | 3/1947 | Jenkins |
| 2,557,593 A | 6/1951 | Bjorkman |
| 2,557,606 A | 6/1951 | Liedberg |
| 2,559,091 A | 7/1951 | Reasenberg |
| 2,609,961 A | 9/1952 | Sapien |
| 2,612,899 A | 10/1952 | Webb |
| 2,646,314 A | 7/1953 | Peeps |
| 2,721,004 A | 10/1955 | Schultz |
| 2,844,267 A | 7/1958 | Petriccione |
| 2,886,252 A | 5/1959 | Ehrensperger |
| 3,090,530 A | 5/1963 | Peeps |
| 3,159,472 A | 12/1964 | Revell |
| D200,594 S | 3/1965 | Sass |
| 3,240,398 A | 3/1966 | Dalton, Jr. |
| D204,306 S | 4/1966 | Hamm |
| D205,760 S | 9/1966 | Hocutt et al. |
| D208,903 S | 10/1967 | Zadron et al. |
| 3,344,992 A | 10/1967 | Norris |
| 3,381,845 A | 5/1968 | MacDonald |
| 3,417,650 A | 12/1968 | Varrin |
| 3,420,106 A | 1/1969 | Keller et al. |
| 3,435,683 A | 4/1969 | Keller et al. |
| 3,482,781 A | 12/1969 | Sharpe |
| D217,928 S | 6/1970 | Felske |
| 3,524,589 A | 8/1970 | Pelton, Jr. |
| 3,527,372 A | 9/1970 | Manning |
| 3,583,632 A | 6/1971 | Schaffer |
| 3,622,078 A | 11/1971 | Gronert |
| 3,645,562 A | 2/1972 | Fandetti et al. |
| 3,656,493 A | 4/1972 | Black et al. |
| 3,714,967 A | 2/1973 | Zupan et al. |
| 3,746,253 A | 7/1973 | Walberg |
| 3,747,850 A | 7/1973 | Hastings et al. |
| 3,771,539 A | 11/1973 | De Santis |
| 3,840,143 A | 10/1974 | Davis et al. |
| 3,848,807 A | 11/1974 | Partida |
| 3,857,511 A | 12/1974 | Govindan |
| 3,870,223 A | 3/1975 | Wyant |
| 3,873,023 A | 3/1975 | Moss et al. |
| 4,000,915 A | 1/1977 | Strom |
| D245,048 S | 7/1977 | Pool |
| D252,097 S | 6/1979 | Probst et al. |
| 4,160,525 A | 7/1979 | Wagner |
| 4,210,263 A | 7/1980 | Bos |
| 4,273,293 A | 6/1981 | Hastings |
| 4,411,387 A | 10/1983 | Stern et al. |
| 4,478,370 A | 10/1984 | Hastings |
| D276,472 S | 11/1984 | Harrison |
| D278,543 S | 4/1985 | Gintz |
| 4,545,536 A | 10/1985 | Avidon |
| 4,562,965 A | 1/1986 | Ihmels et al. |
| 4,580,035 A | 4/1986 | Luscher |
| 4,585,168 A | 4/1986 | Even et al. |
| 4,614,300 A | 9/1986 | Falcoff |
| 4,643,330 A | 2/1987 | Kennedy |
| 4,653,661 A | 3/1987 | Buchner et al. |
| 4,667,878 A | 5/1987 | Behr |
| 4,713,257 A | 12/1987 | Luttermoller |
| D293,950 S | 1/1988 | Ogden et al. |
| 4,730,753 A | 3/1988 | Grime |
| D298,372 S | 11/1988 | Taylor, Jr. |
| 4,784,184 A | 11/1988 | Gates |
| 4,806,736 A | 2/1989 | Schirico |
| 4,826,539 A | 5/1989 | Harpold |
| 4,832,232 A | 5/1989 | Broccoli |
| 4,863,781 A | 9/1989 | Kronzer |
| 4,877,144 A | 10/1989 | Thanisch |
| D305,057 S | 12/1989 | Morgan |
| 4,887,747 A | 12/1989 | Ostrowsky et al. |
| 4,901,761 A | 2/1990 | Taylor |
| 4,906,151 A | 3/1990 | Kubis |
| 4,917,300 A | 4/1990 | Gloviak et al. |
| 4,946,075 A | 8/1990 | Lundback |
| 4,964,361 A | 10/1990 | Aebersold |
| 4,967,600 A | 11/1990 | Keller |
| 4,969,603 A | 11/1990 | Norman |
| 4,973,184 A | 11/1990 | La Salle |
| D314,421 S | 2/1991 | Tajima et al. |
| D314,588 S | 2/1991 | Denham |
| 4,989,787 A | 2/1991 | Nikkel et al. |
| 5,020,700 A | 6/1991 | Krzywdziak et al. |
| D318,877 S | 8/1991 | Miranda et al. |
| 5,042,840 A | 8/1991 | Rieple et al. |
| D321,597 S | 11/1991 | Cerny |
| 5,064,119 A | 11/1991 | Mellette |
| 5,071,074 A | 12/1991 | Lind |
| 5,074,334 A | 12/1991 | Onodera |
| 5,078,323 A | 1/1992 | Frank |
| 5,080,285 A | 1/1992 | Toth |
| 5,088,648 A | 2/1992 | Schmon |
| 5,090,623 A | 2/1992 | Burns et al. |
| 5,102,045 A | 4/1992 | Diana |
| 5,119,992 A | 6/1992 | Grime |
| 5,125,391 A | 6/1992 | Srivastava et al. |
| 5,135,124 A | 8/1992 | Wobser |
| 5,143,102 A | 9/1992 | Blaul |
| 5,165,605 A | 11/1992 | Morita et al. |
| 5,170,941 A | 12/1992 | Morita et al. |
| 5,190,219 A * | 3/1993 | Copp, Jr. ............... B05B 7/0081 239/296 |
| 5,191,797 A | 3/1993 | Smith |
| 5,228,488 A | 7/1993 | Fletcher |
| 5,232,299 A | 8/1993 | Hiss |
| 5,236,128 A | 8/1993 | Morita et al. |
| 5,249,746 A | 10/1993 | Kaneko et al. |
| 5,289,974 A | 3/1994 | Grime et al. |
| 5,322,221 A | 6/1994 | Anderson |
| 5,325,473 A | 6/1994 | Monroe et al. |
| 5,332,156 A | 7/1994 | Wheeler |
| 5,333,506 A | 8/1994 | Smith et al. |
| 5,333,908 A | 8/1994 | Dorney et al. |
| 5,344,078 A | 9/1994 | Fritz et al. |
| 5,367,148 A | 11/1994 | Storch et al. |
| D353,836 S | 12/1994 | Carvelli et al. |
| 5,381,962 A | 1/1995 | Teague |
| 5,435,491 A | 7/1995 | Sakuma |
| 5,443,642 A | 8/1995 | Bienduga |
| 5,456,414 A | 10/1995 | Burns et al. |
| D365,952 S | 1/1996 | Gagnon et al. |
| 5,503,439 A | 4/1996 | LaJeunesse et al. |
| 5,533,674 A | 7/1996 | Feyrer et al. |
| 5,540,385 A | 7/1996 | Garlick |
| 5,540,386 A | 7/1996 | Roman |
| 5,582,350 A | 12/1996 | Kosmyna et al. |
| 5,584,899 A | 12/1996 | Shorts |
| 5,588,562 A | 12/1996 | Sander et al. |
| 5,592,597 A | 1/1997 | Kiss |
| 5,609,302 A | 3/1997 | Smith |
| 5,613,637 A | 3/1997 | Schmon |

(56) References Cited

U.S. PATENT DOCUMENTS

| | | |
|---|---|---|
| D380,301 S | 7/1997 | Kogutt |
| 5,655,714 A | 8/1997 | Kieffer et al. |
| 5,662,444 A | 9/1997 | Schmidt, Jr. |
| 5,695,125 A | 12/1997 | Kumar |
| 5,704,381 A | 1/1998 | Millan et al. |
| 5,718,767 A | 2/1998 | Crum et al. |
| D391,403 S | 3/1998 | Josephs |
| RE35,769 E | 4/1998 | Grime et al. |
| 5,762,228 A | 6/1998 | Morgan et al. |
| 5,803,360 A | 9/1998 | Spitznagel |
| 5,816,501 A | 10/1998 | LoPresti et al. |
| 5,836,517 A | 11/1998 | Burns et al. |
| D402,820 S | 12/1998 | Morison et al. |
| 5,843,515 A | 12/1998 | Crum et al. |
| 5,853,014 A | 12/1998 | Rosenauer |
| D405,503 S | 2/1999 | Edo |
| 5,874,680 A | 2/1999 | Moore |
| 5,884,006 A | 3/1999 | Frohlich et al. |
| D409,719 S | 5/1999 | Kaneko |
| 5,941,461 A | 8/1999 | Akin et al. |
| 5,951,190 A | 9/1999 | Wilson |
| 5,951,296 A | 9/1999 | Klein |
| 5,954,268 A | 9/1999 | Joshi et al. |
| D414,636 S | 10/1999 | Wiese |
| 5,979,797 A | 11/1999 | Castellano |
| 5,992,763 A | 11/1999 | Smith et al. |
| 6,006,930 A | 12/1999 | Dreyer et al. |
| 6,010,082 A | 1/2000 | Peterson |
| 6,017,394 A | 1/2000 | Crum et al. |
| 6,036,109 A | 3/2000 | DeYoung |
| 6,039,218 A | 3/2000 | Beck |
| 6,053,429 A | 4/2000 | Chang |
| 6,056,213 A | 5/2000 | Ruta et al. |
| 6,089,471 A | 7/2000 | Scholl |
| 6,089,607 A | 7/2000 | Keeney et al. |
| 6,091,053 A | 7/2000 | Aonuma |
| 6,092,740 A | 7/2000 | Liu |
| 6,132,511 A | 10/2000 | Crum et al. |
| D435,379 S | 12/2000 | Nguyen |
| 6,250,567 B1 | 6/2001 | Lewis et al. |
| 6,276,616 B1 | 8/2001 | Jenkins |
| D448,451 S | 9/2001 | Turnbull et al. |
| 6,308,991 B1 | 10/2001 | Royer |
| D457,599 S | 5/2002 | Karwoski et al. |
| D459,432 S | 6/2002 | Schmon |
| D459,433 S | 6/2002 | Schmon |
| 6,402,058 B2 | 6/2002 | Kaneko et al. |
| 6,402,062 B1 | 6/2002 | Bending et al. |
| 6,431,466 B1 | 8/2002 | Kitajima |
| 6,435,426 B1 | 8/2002 | Copp, Jr. |
| 6,442,276 B1 | 8/2002 | Doljack |
| 6,494,387 B1 | 12/2002 | Kaneko |
| 6,536,684 B1 | 3/2003 | Wei |
| 6,536,687 B1 | 3/2003 | Navis et al. |
| D472,730 S | 4/2003 | Sparkowski |
| 6,540,114 B1 | 4/2003 | Popovich et al. |
| 6,543,632 B1 | 4/2003 | McIntyre et al. |
| 6,547,884 B1 | 4/2003 | Crum et al. |
| 6,553,712 B1 | 4/2003 | Majerowski et al. |
| 6,554,009 B1 | 4/2003 | Beijbom et al. |
| D474,528 S | 5/2003 | Huang |
| 6,585,173 B2 | 7/2003 | Schmon et al. |
| 6,595,441 B2 | 7/2003 | Petrie et al. |
| 6,626,382 B1 | 9/2003 | Liu |
| 6,626,383 B1 | 9/2003 | Campbell |
| 6,647,997 B2 | 11/2003 | Mohn |
| 6,661,438 B1 | 12/2003 | Shiraishi et al. |
| D485,685 S | 1/2004 | Zupkofska et al. |
| 6,675,845 B2 | 1/2004 | Volpenheim et al. |
| 6,692,118 B2 | 2/2004 | Michele et al. |
| 6,712,292 B1 | 3/2004 | Gosis et al. |
| 6,717,584 B2 | 4/2004 | Kulczycka |
| 6,732,751 B2 | 5/2004 | Chiang |
| 6,763,964 B1 | 7/2004 | Hurlbut et al. |
| 6,766,763 B2 | 7/2004 | Crum et al. |
| 6,786,345 B2 | 9/2004 | Richards |
| 6,796,514 B1 | 9/2004 | Schwartz |
| 6,801,211 B2 | 10/2004 | Forsline et al. |
| 6,820,824 B1 | 11/2004 | Joseph et al. |
| 6,843,390 B1 | 1/2005 | Bristor |
| 6,845,924 B2 | 1/2005 | Schmon |
| 6,855,173 B2 | 2/2005 | Ehrnsperger et al. |
| 6,863,310 B1 | 3/2005 | Petkovsek |
| 6,863,920 B2 | 3/2005 | Crum et al. |
| 6,874,656 B2 | 4/2005 | Rohr et al. |
| 6,874,664 B1 | 4/2005 | Montgomery |
| 6,874,708 B2 * | 4/2005 | Reetz, III ............. B05B 7/0081 210/234 |
| 6,877,677 B2 | 4/2005 | Schmon et al. |
| 6,929,019 B2 | 8/2005 | Weinmann et al. |
| 6,945,429 B2 | 9/2005 | Gosis et al. |
| 6,955,180 B2 | 10/2005 | Kocherlakota et al. |
| 6,962,432 B2 | 11/2005 | Hofeldt |
| 6,963,331 B1 | 11/2005 | Kobayashi et al. |
| 7,017,838 B2 | 3/2006 | Schmon |
| 7,018,154 B2 | 3/2006 | Schmon |
| D519,687 S | 4/2006 | Zahav |
| 7,036,752 B1 | 5/2006 | Hsiang |
| 7,083,119 B2 | 8/2006 | Bouic et al. |
| 7,090,148 B2 | 8/2006 | Petrie et al. |
| 7,097,118 B1 | 8/2006 | Huang |
| D528,192 S | 9/2006 | Nicholson |
| 7,106,343 B1 | 9/2006 | Hickman |
| 7,165,732 B2 | 1/2007 | Kosmyna et al. |
| 7,172,139 B2 | 2/2007 | Bouic et al. |
| 7,175,110 B2 | 2/2007 | Vicentini |
| 7,182,213 B2 | 2/2007 | King |
| D538,050 S | 3/2007 | Tardif |
| D538,493 S | 3/2007 | Zimmerle et al. |
| D538,886 S | 3/2007 | Huang |
| 7,194,829 B2 | 3/2007 | Boire et al. |
| D541,053 S | 4/2007 | Sanders |
| D541,088 S | 4/2007 | Nesci |
| 7,201,336 B2 | 4/2007 | Blette et al. |
| 7,216,813 B2 | 5/2007 | Rogers |
| D545,943 S | 7/2007 | Rodgers et al. |
| 7,246,713 B2 | 7/2007 | King |
| 7,249,519 B2 | 7/2007 | Rogers |
| D548,816 S | 8/2007 | Schmon |
| 7,255,293 B2 | 8/2007 | Dodd |
| 7,264,131 B2 | 9/2007 | Tsutsumi et al. |
| D552,213 S | 10/2007 | Schmon |
| D552,715 S | 10/2007 | Schmon |
| D554,703 S | 11/2007 | Josephson |
| D563,505 S | 3/2008 | Schmon |
| 7,374,111 B2 | 5/2008 | Joseph et al. |
| D571,463 S | 6/2008 | Chesnin |
| 7,384,004 B2 | 6/2008 | Rogers |
| RE40,433 E | 7/2008 | Schmon |
| D573,227 S | 7/2008 | Mirazita et al. |
| D574,926 S | 8/2008 | Huang |
| D575,374 S | 8/2008 | Huang |
| 7,410,106 B2 | 8/2008 | Escoto, Jr. et al. |
| 7,416,140 B2 | 8/2008 | Camilleri et al. |
| 7,422,164 B2 | 9/2008 | Matsumoto |
| D579,213 S | 10/2008 | Aipa |
| D581,107 S | 11/2008 | Schmon |
| D581,483 S | 11/2008 | Bass et al. |
| D583,013 S | 12/2008 | Wang |
| 7,458,612 B1 | 12/2008 | Bennett |
| 7,533,678 B2 | 5/2009 | Rosa |
| 7,540,434 B2 | 6/2009 | Gohring et al. |
| 7,542,032 B2 | 6/2009 | Kruse |
| 7,568,638 B2 | 8/2009 | Gehrung |
| D604,394 S | 11/2009 | Wang |
| 7,614,571 B2 | 11/2009 | Camilleri et al. |
| D607,086 S | 12/2009 | Kosaka |
| 7,624,869 B2 | 12/2009 | Primer |
| D607,972 S | 1/2010 | Wang |
| D608,858 S | 1/2010 | Baltz et al. |
| D614,731 S | 4/2010 | Wang |
| 7,694,893 B2 * | 4/2010 | Zittel ................. B01F 5/0256 239/117 |
| 7,694,896 B2 | 4/2010 | Turnbull et al. |

(56) References Cited

U.S. PATENT DOCUMENTS

| | | |
|---|---|---|
| D615,586 S | 5/2010 | Kudimi |
| D616,022 S | 5/2010 | Kudimi |
| D616,527 S | 5/2010 | Anderson et al. |
| 7,765,876 B1 | 8/2010 | Chen |
| D624,668 S | 9/2010 | Noppe |
| 7,810,744 B2 | 10/2010 | Schmon et al. |
| 7,819,341 B2 | 10/2010 | Schmon et al. |
| D627,039 S | 11/2010 | Yu |
| D627,432 S | 11/2010 | Escoto et al. |
| 7,823,806 B2 | 11/2010 | Schmon |
| D629,623 S | 12/2010 | Lampe |
| 7,913,938 B2 | 3/2011 | Cooper |
| 7,922,107 B2 | 4/2011 | Fox |
| D637,269 S | 5/2011 | Wang |
| D638,121 S | 5/2011 | Villasana |
| D639,863 S | 6/2011 | Langan |
| D641,067 S | 7/2011 | Wang |
| D644,716 S | 9/2011 | Gehrung |
| D644,803 S | 9/2011 | Schmon |
| D645,094 S | 9/2011 | Langan |
| 8,042,402 B2 | 10/2011 | Brown et al. |
| D649,196 S | 11/2011 | Langan |
| 8,052,071 B2 | 11/2011 | Kruse |
| D655,347 S | 3/2012 | Gehrung |
| 8,127,963 B2 | 3/2012 | Gerson et al. |
| D657,276 S | 4/2012 | Brose |
| D661,742 S | 6/2012 | Clark |
| D663,960 S | 7/2012 | Jeronimo |
| 8,225,892 B2 | 7/2012 | Ben-Tzvi |
| 8,240,579 B1 | 8/2012 | Bennett |
| 8,297,536 B2 | 10/2012 | Ruda |
| D670,085 S | 11/2012 | Brookman et al. |
| D671,988 S | 12/2012 | Leipold |
| D672,012 S | 12/2012 | Brose |
| D674,880 S | 1/2013 | Schmon |
| 8,352,744 B2 | 1/2013 | Kruse |
| D681,162 S | 4/2013 | Kruse |
| 8,444,067 B2 | 5/2013 | Schmon et al. |
| 8,454,759 B2 | 6/2013 | Selsvik |
| 8,481,124 B2 | 7/2013 | Nolte et al. |
| D689,590 S | 9/2013 | Brose |
| D689,593 S | 9/2013 | Schmon |
| D690,799 S | 10/2013 | Maier |
| D692,530 S | 10/2013 | Gehrung |
| D692,532 S | 10/2013 | Li et al. |
| 8,616,434 B2 | 12/2013 | Wilen |
| D698,008 S | 1/2014 | Schmon et al. |
| 8,626,674 B2 | 1/2014 | Whitehouse |
| 8,642,131 B2 | 2/2014 | Nolte et al. |
| D704,300 S | 5/2014 | Li et al. |
| 8,757,182 B2 | 6/2014 | Schmon |
| 8,807,460 B2 | 8/2014 | Charpie et al. |
| 8,857,732 B2 | 10/2014 | Brose |
| D720,015 S | 12/2014 | Kruse |
| 8,899,501 B2 | 12/2014 | Fox et al. |
| D721,785 S | 1/2015 | Gehrung |
| 8,925,836 B2 | 1/2015 | Dettlaff |
| D733,369 S | 6/2015 | Tschan |
| D733,453 S | 7/2015 | Tschan |
| D734,571 S | 7/2015 | Tschan |
| 9,073,068 B2 | 7/2015 | Krayer et al. |
| D737,126 S | 8/2015 | Tschan |
| D740,393 S | 10/2015 | Gehrung |
| D757,216 S | 5/2016 | Gehrung |
| D758,533 S | 6/2016 | Dettlaff |
| D758,537 S | 6/2016 | Gehrung |
| 2001/0004996 A1 | 6/2001 | Schmon |
| 2001/0040192 A1 | 11/2001 | Kaneko et al. |
| 2002/0134861 A1 | 9/2002 | Petrie et al. |
| 2002/0148501 A1 | 10/2002 | Shieh |
| 2002/0170978 A1 | 11/2002 | Mohn |
| 2003/0025000 A1 | 2/2003 | Schmon et al. |
| 2003/0066218 A1 | 4/2003 | Schweikert |
| 2003/0121476 A1 | 7/2003 | McIntyre et al. |
| 2003/0127046 A1 | 7/2003 | Zehner et al. |
| 2003/0164408 A1 | 9/2003 | Schmon |
| 2003/0177979 A1 | 9/2003 | Crum et al. |
| 2003/0189105 A1 | 10/2003 | Schmon |
| 2003/0209568 A1 | 11/2003 | Douglas et al. |
| 2003/0213857 A1 | 11/2003 | Schmon et al. |
| 2003/0218596 A1 | 11/2003 | Eschler |
| 2003/0230636 A1 | 12/2003 | Rogers |
| 2004/0046051 A1 | 3/2004 | Santa Cruz et al. |
| 2004/0050432 A1 | 3/2004 | Breda |
| 2004/0104194 A1 | 6/2004 | Dennison |
| 2004/0129738 A1 | 7/2004 | Stukas |
| 2004/0140373 A1 | 7/2004 | Joseph et al. |
| 2004/0155063 A1 | 8/2004 | Hofeldt |
| 2004/0177890 A1 | 9/2004 | Weinmann |
| 2004/0191406 A1 | 9/2004 | Crum et al. |
| 2004/0217201 A1 | 11/2004 | Ruda |
| 2004/0233223 A1 | 11/2004 | Schkolne et al. |
| 2004/0245208 A1 | 12/2004 | Dennison |
| 2005/0056613 A1 | 3/2005 | King |
| 2005/0082249 A1 | 4/2005 | King |
| 2005/0127201 A1 | 6/2005 | Matsumoto |
| 2005/0145723 A1 | 7/2005 | Blette et al. |
| 2005/0145724 A1 | 7/2005 | Blette et al. |
| 2005/0178854 A1 | 8/2005 | Dodd |
| 2005/0220943 A1 | 10/2005 | Abrams et al. |
| 2005/0248148 A1 | 11/2005 | Schenck et al. |
| 2005/0252993 A1 | 11/2005 | Rogers |
| 2005/0252994 A1 | 11/2005 | Rogers |
| 2005/0268949 A1 | 12/2005 | Rosa |
| 2005/0284963 A1 | 12/2005 | Reedy |
| 2006/0000927 A1 | 1/2006 | Ruda |
| 2006/0007123 A1 | 1/2006 | Wilson et al. |
| 2006/0048803 A1 | 3/2006 | Jessup et al. |
| 2006/0081060 A1 | 4/2006 | Forster |
| 2006/0113409 A1 | 6/2006 | Camilleri et al. |
| 2006/0171771 A1 | 8/2006 | Kruse |
| 2006/0192377 A1 | 8/2006 | Bauer et al. |
| 2006/0196891 A1 | 9/2006 | Gerson et al. |
| 2007/0029788 A1 | 2/2007 | Adler |
| 2007/0055883 A1 | 3/2007 | Kruse |
| 2007/0131795 A1 | 6/2007 | Abbate et al. |
| 2007/0158349 A1 | 7/2007 | Schmon et al. |
| 2007/0205305 A1 | 9/2007 | Vagedes |
| 2007/0221754 A1 | 9/2007 | Gehrung |
| 2007/0252378 A1 | 11/2007 | Chambers |
| 2008/0011879 A1 | 1/2008 | Gerson et al. |
| 2008/0019789 A1 | 1/2008 | Dunaway et al. |
| 2008/0029619 A1 | 2/2008 | Gohring et al. |
| 2008/0128533 A1 | 6/2008 | Gehrung |
| 2008/0179763 A1 | 7/2008 | Schmon et al. |
| 2008/0251977 A1 | 10/2008 | Naruse et al. |
| 2008/0264892 A1 | 10/2008 | Nozawa |
| 2008/0272213 A1 | 11/2008 | Ting |
| 2008/0296410 A1 | 12/2008 | Carey et al. |
| 2009/0014557 A1 | 1/2009 | Schmon et al. |
| 2009/0026290 A1 | 1/2009 | Fox |
| 2009/0045623 A1 | 2/2009 | Schmon |
| 2009/0072050 A1 | 3/2009 | Ruda |
| 2009/0078789 A1 | 3/2009 | Kruse |
| 2009/0078790 A1 | 3/2009 | Camilleri et al. |
| 2009/0143745 A1 | 6/2009 | Langan et al. |
| 2009/0183516 A1 | 7/2009 | Appler et al. |
| 2009/0235864 A1 | 9/2009 | Khoury et al. |
| 2009/0266915 A1 | 10/2009 | Fedorov |
| 2010/0021646 A1 | 1/2010 | Nolte et al. |
| 2010/0059533 A1 | 3/2010 | Unger et al. |
| 2010/0084493 A1 | 4/2010 | Troudt |
| 2010/0108783 A1 | 5/2010 | Joseph et al. |
| 2010/0126541 A1 | 5/2010 | Schmon |
| 2010/0206963 A1 | 8/2010 | Huang |
| 2011/0024524 A1 | 2/2011 | Fox |
| 2011/0121103 A1 | 5/2011 | Carleton et al. |
| 2011/0125607 A1 | 5/2011 | Wilen |
| 2011/0127767 A1 | 6/2011 | Wicks et al. |
| 2011/0168811 A1 | 7/2011 | Fox et al. |
| 2011/0174901 A1 | 7/2011 | Dettlaff et al. |
| 2012/0012671 A1 | 1/2012 | Brose et al. |
| 2012/0097762 A1 | 4/2012 | Gehrung et al. |
| 2012/0132550 A1 | 5/2012 | Gerson et al. |

(56) References Cited

U.S. PATENT DOCUMENTS

| | | |
|---|---|---|
| 2012/0160935 A1 | 6/2012 | Krayer et al. |
| 2013/0056556 A1 | 3/2013 | Schmon et al. |
| 2013/0074864 A1 | 3/2013 | Nuzzo et al. |
| 2013/0266734 A1 | 10/2013 | Nolte et al. |
| 2013/0320110 A1 | 12/2013 | Brose et al. |
| 2014/0048627 A1 | 2/2014 | Schmon et al. |
| 2014/0059905 A1 | 3/2014 | Raming |
| 2014/0145003 A1 | 5/2014 | Schmon et al. |
| 2014/0305962 A1 | 10/2014 | Tschan |
| 2016/0030960 A1 | 2/2016 | Gehrung |

FOREIGN PATENT DOCUMENTS

| | | |
|---|---|---|
| AT | 250467 | 10/2003 |
| AT | 322645 | 4/2006 |
| AT | 383910 | 2/2008 |
| AT | 461752 | 4/2010 |
| AT | 461753 | 4/2010 |
| AT | 475488 | 8/2010 |
| AU | 637187 | 5/1993 |
| AU | 2002352235 | 9/2003 |
| AU | 2004315547 | 8/2005 |
| AU | 2005205899 | 8/2005 |
| AU | 2011257605 | 11/2012 |
| AU | 2011361295 | 5/2013 |
| CA | 521511 | 2/1956 |
| CA | 2126957 | 1/1995 |
| CA | 2277096 | 7/1998 |
| CA | 2445183 | 10/2002 |
| CA | 2552390 | 8/2005 |
| CA | 2555607 | 8/2005 |
| CA | 2690112 | 5/2009 |
| CA | 2797990 | 12/2011 |
| CA | 2812684 | 9/2012 |
| CA | 102917803 | 2/2013 |
| CH | 203 668 | 6/1939 |
| CH | 542104 A | 9/1973 |
| CH | 676208 | 12/1990 |
| CN | 1902002 | 1/2007 |
| CN | 1909970 | 2/2007 |
| CN | 1909971 | 2/2007 |
| CN | 1917960 | 2/2007 |
| CN | 200954482 | 10/2007 |
| CN | 101125316 | 2/2008 |
| CN | 100430150 | 11/2008 |
| CN | 100455360 | 1/2009 |
| CN | 101367066 | 2/2009 |
| CN | 100478080 | 4/2009 |
| CN | 101646500 | 2/2010 |
| CN | 102211070 | 4/2011 |
| CN | 102211069 | 10/2011 |
| DE | 460381 | 5/1928 |
| DE | 510362 | 10/1930 |
| DE | 1425890 | 11/1968 |
| DE | 2559036 | 9/1976 |
| DE | 2653981 | 6/1978 |
| DE | 2950341 | 7/1980 |
| DE | 3016419 | 11/1981 |
| DE | 8024829.9 | 9/1982 |
| DE | 34 02 097 | 8/1985 |
| DE | 3402945 A1 | 8/1985 |
| DE | 3517122 | 5/1986 |
| DE | 3505618 | 8/1986 |
| DE | 3526819 | 2/1987 |
| DE | 3016419 C2 | 8/1987 |
| DE | 8702559 | 10/1987 |
| DE | 3708472 A1 | 10/1988 |
| DE | 8902223 | 5/1989 |
| DE | 3742308 | 6/1989 |
| DE | 8905681 | 11/1989 |
| DE | G 90 01 265 | 5/1990 |
| DE | 3906219 | 8/1990 |
| DE | 4302911 | 8/1993 |
| DE | 4230535 | 3/1994 |
| DE | 4321940 | 1/1995 |
| DE | 19516485 | 11/1996 |
| DE | 19727884 | 2/1999 |
| DE | 69505433 T2 | 4/1999 |
| DE | 19807973 | 7/1999 |
| DE | 19824264 | 12/1999 |
| DE | 19832990 | 1/2000 |
| DE | 20000483 | 8/2000 |
| DE | 10004105 | 10/2000 |
| DE | 19958569 | 2/2001 |
| DE | 199 41 362 | 3/2001 |
| DE | 199 45 760 | 3/2001 |
| DE | 19945760 | 3/2001 |
| DE | 10031857 | 1/2002 |
| DE | 10031858 | 1/2002 |
| DE | 20114257 | 2/2002 |
| DE | 10059406 | 6/2002 |
| DE | 10135104 | 9/2002 |
| DE | 102 05 831 | 8/2003 |
| DE | 03069208 A1 | 8/2003 |
| DE | 10205831 | 8/2003 |
| DE | 10311238 | 10/2004 |
| DE | 10 2004 027 789 | 2/2005 |
| DE | 10 2004 027789 | 2/2005 |
| DE | 29825120 | 2/2005 |
| DE | 2004027789 A1 | 2/2005 |
| DE | 20320781 | 6/2005 |
| DE | 10 2004 014 646 | 7/2005 |
| DE | 10 2004 003 438 | 8/2005 |
| DE | 102004003439 | 8/2005 |
| DE | 10 2004 007 733 | 9/2005 |
| DE | 10 2004 021 298 | 11/2005 |
| DE | 69535077 T2 | 11/2006 |
| DE | 202007001031 | 3/2007 |
| DE | 60200500 1173 | 8/2007 |
| DE | 60206956 T2 | 8/2008 |
| DE | 102007006547 | 8/2008 |
| DE | 102007039106 | 2/2009 |
| DE | 102007052067 | 5/2009 |
| DE | 202010012449 | 12/2010 |
| DE | 102009053449 | 2/2011 |
| DE | 102010060086 | 4/2012 |
| DE | 102011106060 | 1/2013 |
| DE | 102011118120 | 5/2013 |
| EP | 0092392 | 10/1983 |
| EP | 524408 | 1/1993 |
| EP | 567325 | 10/1993 |
| EP | 0631821 | 1/1995 |
| EP | 0650766 | 5/1995 |
| EP | 678334 | 10/1995 |
| EP | 0706832 | 4/1996 |
| EP | 801002 | 10/1997 |
| EP | 987060 | 3/2000 |
| EP | 1081639 | 3/2001 |
| EP | 1106262 | 6/2001 |
| EP | 1247586 | 10/2002 |
| EP | 1277519 | 1/2003 |
| EP | 1294490 | 3/2003 |
| EP | 1299194 | 4/2003 |
| EP | 1366823 | 12/2003 |
| EP | 1412669 | 4/2004 |
| EP | 1424135 | 6/2004 |
| EP | 1477232 A1 | 11/2004 |
| EP | 1479447 A1 | 11/2004 |
| EP | 1504823 A1 | 2/2005 |
| EP | 1563913 | 8/2005 |
| EP | 1574262 | 9/2005 |
| EP | 1602412 | 12/2005 |
| EP | 1708822 | 10/2006 |
| EP | 1708823 | 10/2006 |
| EP | 1718415 | 11/2006 |
| EP | 1880771 A1 | 1/2008 |
| EP | 1902766 A1 | 3/2008 |
| EP | 1902786 | 3/2008 |
| EP | 1902876 | 3/2008 |
| EP | 1930084 | 6/2008 |
| EP | 1964616 | 9/2008 |
| EP | 1964616 A2 | 9/2008 |
| EP | 2027931 | 2/2009 |

(56) References Cited

FOREIGN PATENT DOCUMENTS

| | | |
|---|---|---|
| EP | 2106298 | 10/2009 |
| EP | 2111920 | 10/2009 |
| EP | 2490819 | 8/2012 |
| EP | 2576079 | 4/2013 |
| EP | 2608890 | 7/2013 |
| FR | 398333 | 6/1909 |
| FR | 789762 | 11/1935 |
| FR | 1410519 | 9/1964 |
| FR | 2444501 | 7/1980 |
| FR | 2462200 A1 | 2/1981 |
| FR | 2 570 140 | 3/1986 |
| FR | 2 774 928 | 8/1999 |
| FR | 2927824 A1 | 8/2009 |
| GB | 190900523 | 6/1909 |
| GB | 2 132 916 | 7/1984 |
| GB | 2153260 | 8/1985 |
| GB | 2372465 | 8/2002 |
| GB | 2411235 | 8/2005 |
| HK | 1100405 | 6/2009 |
| HK | 1096057 | 7/2009 |
| HK | 1125067 | 8/2012 |
| HK | 1138533 | 11/2012 |
| JP | S5654328 | 5/1981 |
| JP | S57-75246 | 5/1982 |
| JP | 58-119862 | 5/1983 |
| JP | S5998757 | 6/1984 |
| JP | S601722 | 1/1985 |
| JP | H01-87805 | 6/1989 |
| JP | H0530749 | 4/1993 |
| JP | H05172678 | 7/1993 |
| JP | 674850 | 3/1994 |
| JP | H06215741 | 8/1994 |
| JP | H08196950 | 8/1996 |
| JP | H09117697 | 5/1997 |
| JP | 2001259487 | 9/2001 |
| JP | 2003042882 | 2/2002 |
| JP | 2003088780 | 3/2003 |
| JP | 2004017044 | 1/2004 |
| JP | 2005138885 | 6/2005 |
| JP | 2007516831 | 6/2007 |
| TW | 491092 | 6/2002 |
| TW | I220392 | 8/2004 |
| TW | I303587 | 12/2008 |
| TW | I309584 | 5/2009 |
| WO | 90/08456 | 8/1990 |
| WO | 91/16610 | 10/1991 |
| WO | 92/07346 | 4/1992 |
| WO | 9522409 | 8/1995 |
| WO | 98/32539 | 7/1998 |
| WO | 01/12337 | 2/2001 |
| WO | 0166261 | 9/2001 |
| WO | 01/99062 | 12/2001 |
| WO | 02/00355 | 1/2002 |
| WO | 0202242 | 1/2002 |
| WO | 02/18061 | 3/2002 |
| WO | 02/085533 | 10/2002 |
| WO | 03/007252 | 1/2003 |
| WO | 03/045575 | 6/2003 |
| WO | 03/069208 | 8/2003 |
| WO | 2004/037433 | 5/2004 |
| WO | 2004/052552 | 6/2004 |
| WO | 2005/018815 | 3/2005 |
| WO | 2005/068220 | 7/2005 |
| WO | 2005/070557 | 8/2005 |
| WO | 2005/070558 | 8/2005 |
| WO | 2005/077543 | 8/2005 |
| WO | 2005/115631 | 12/2005 |
| WO | 2006065850 | 6/2006 |
| WO | 2007/128127 | 11/2007 |
| WO | 2007133386 A2 | 11/2007 |
| WO | 2007/149760 A2 | 12/2007 |
| WO | 2009015260 | 1/2009 |
| WO | 2009056424 | 5/2009 |
| WO | 2011047876 | 4/2011 |
| WO | 2011147555 | 12/2011 |
| WO | 2012119664 | 9/2012 |
| WO | 2013000524 | 1/2013 |
| WO | 2013016474 | 1/2013 |

OTHER PUBLICATIONS

Response filed Dec. 7, 2015 to Office Action dated Aug. 7, 2015 for U.S. Appl. No. 13/991,285.
Printout from Internet www.ehow.com explaining how to choose a spray gun and stating in item 2 "Nozzle sizes vary between about 1 mm and 2 mm.", printed Sep. 7, 2012.
Printout from Internet www.bodyshopbusiness.com explaining how to choose nozzle setup in paragraph bridging pp. 1 and 2, giving general rule of thumb of nozzle sizes from 1.3 mm to 2.2 mm, depending on material being sprayed, printed Sep. 7, 2012.
Printout from Internet of pages from brochure of Walther Pilot showing nozzle sizes for spray guns ranging from 0.3 mm to 2.5 mm, dated 2007.
Printout from Internet www.alsacorp.com showing in the paragraph bridging pp. 2 and 3, Model VS-7200 Saber LVLP spray gun with nozzle size 1.3 mm with sizes 1.3 to 2.0 available, printed Aug. 26, 2012.
Printout from Internet of p. 28 from current 3Mtm brochure showing Tip/Nozzle/Air Cap Selection Guide with nozzle sizes from 0.5 mm to 3.0 mm.
Decision by EPO regarding opposition proceedings to revoke patent No. 99926841.0-2425/1108476, corresponding to '387 patent, 2012.
SATA News Publication Dan-Am Jul.-Sep. 1996.
SATA News Publication Dan-Am Oct.-Dec. 1996.
SATA News Publication Dan-Am Apr.-Jun. 1998.
Dan-Am SATA Catalog 6 for spray guns 1991.
Dan-Am SATA Catalog 8 for spray guns 1994.
Dan-Am Catalog 6—51pp published 1991.
Japanese Industrial Standards B 9809 English translation.
Japanese Industrial Standards B 9809 revised Mar. 1, 1991.
SATA News, vol. 21, 2009.
Collision Hub TV Document (image from video clip) printed Oct. 9, 2013.
MyRielsMe.com document from press release printed Oct. 9, 2013.
How to set Air pressure, Utube screenshot printed Oct. 9, 2013.
Ohio EPA Letty to Tony Larimer, response to letter dated Aug. 2006.
Pinahs Ben-Tzvi et al, A conceptual design . . . , Mechatrronics 17 (2007) p. 1-13.
On line ad from Amazon.com printed Oct. 14, 2013.
Rone et al, MEMS-Baed Microdroplet Generation with Integrated Sensing, COMSOL, 2011.
International Search Report, Written Opinion and International Preliminary Report on Patentability for PCT/EP2004/005381 file May 19, 2004.
International Search Report, Written Opinion and International Preliminary Report on Patentability for PCT/EP2004/011998 filed Oct. 23, 2004.
International Search Report, Written Opinion and International Preliminary Report on Patentability for PCT/EP2005/000435 filed Jan. 18, 2005.
International Search Report, Written Opinion and International Preliminary Report on Patentability for PCT/EP2005/00437 filed Jan. 18, 2005.
International Search Report, Written Opinion and International Preliminary Report on Patentability for PCT/EP2008/063344, filed Oct. 6, 2008.
International Search Report, Written Opinion and International Preliminary Report on Patentability for PCT/EP2010/002392 filed Apr. 20, 2010.
International Search Report, Written Opinion and International Preliminary Report on Patentability for PCT/EP2011/002544 filed May 21, 2011.
International Search Report, Written Opinion and International Preliminary Report on Patentability for PCT/EP2011/066665 filed Sep. 26, 2011.
International Search Report, Written Opinion and International Preliminary Report on Patentability for PCT/EP2010/003399 filed Jun. 7, 2010.

(56) References Cited

OTHER PUBLICATIONS

International Search Report, Written Opinion and International Preliminary Report on Patentability for PCT/EP2011/5842 filed Dec. 2, 2010.
International Search Report, Written Opinion and International Preliminary Report on Patentability for PCT/EP2012/01939 filed May 5, 2012.
International Search Report, Written Opinion and International Preliminary Report on Patentability for PCT/EP2009/06992 filed Sep. 29, 2009.
Internet Archive Wayback Machine [online] [captured Sep. 25, 2012] [retrieved on Sep. 8, 2014] retrieved from the Internet URL:http://web.archive.org/web/20120925210554/http://www.sata.com/index.php?id=sal-check&no cache=1&L=11.
JP Office Action issued agains JP Patent App. 2012-508926 on Feb. 25, 2014 with English translation.
Canadian Office Action dated Nov. 21, 2012 for related application CA2741703.
Chinese Search Report dated Dec. 5, 2012 for related application CN200980135429.9.
Chinese Office Action dated Dec. 13, 2012 for related application CN200980135429.9.
German Search Report for DE 20 2008 014 389.6 completed Jul. 13, 2009.
Office Action dated Nov. 18, 2014 for U.S. Appl. No. 14/113,649.
Notice of Allowance dated Nov. 19, 2014 for U.S. Appl. No. 29/486,223.
Office Action dated Dec. 31, 2014 for U.S. Appl. No. 13/380,949.
Restriction Requirement dated Jan. 9, 2015 for Design U.S. Appl. No. 29/469,049.
Response to Office Action filed Dec. 2, 2014 for U.S. Appl. No. 29/487,679.
Notice of Allowance dated Jan. 15, 2015 for Design U.S. Appl. No. 29/490,620.
Office Action dated Jan. 14, 2015 for Design U.S. Appl. No. 29/447,887.
Hercules Paint Gun Washers brochure publish date Jan. 2012, [online], [site visited Jan. 7, 2015], <http://www.herkules.us/pdfs/L00761-Hercules-Gun_Washers-4-page-brochure.pdf>.
Jetclean GUn Cleaner Terry's Auto Supply, google publish date Aug. 4, 2011, [online], [site visited Jan. 7, 2015], <http://secure.terrys.net/viewProduct.php?productID=FT.FHAZ1005>.
Restriction Requirement dated Feb. 6, 2015 for Design U.S. Appl. No. 29/486,232.
Office Action dated Mar. 30, 2015 for U.S. Appl. No. 13/698,417.
Responde to Office Action filed Apr. 14, 2015 to Office Action dated Jan. 14, 2015 for U.S. Appl. No. 29/447,887.
Response filed Jul. 20, 2015 for Office Action dated Mar. 30, 2015 for U.S. Appl. No. 13/698,417.
Notice of Allowance dated Apr. 30, 2015 for U.S. Appl. No. 29/447,887.
Chinese Office Action dated Oct. 28, 2014 and Search Report dared Oct. 15, 2014 for Chinese Application No. 2011800266029.
Australian Examination Report dated Oct. 30, 2012 for Australian Application No. 2010268870.
Notice of Allowance dated Apr. 24, 2015 for Design U.S. Appl. No. 29/486,232.
Restriction Requirement dated Jan. 22, 2015 for U.S. Appl. No. 13/698,417.
Response filed Mar. 23, 2015 to Restriction Requirement dated Jan. 22, 2015 for U.S. Appl. No. 13/698,417.
Response filed Apr. 6, 2015 to Office Action dated Feb. 6, 2015 for Design U.S. Appl. No. 29/486,232.
Response filed Mar. 31, 2015 to Office Action dated Dec. 31, 2014 for U.S. Appl. No. 13/380,949.
Japanese Office Action dated Jun. 11, 2014 for Japanese Patent Application No. 2012-518769.
Australian Examination Report dated Nov. 11, 2014 for Australian patent Application No. 2011257605.
Japanese Notice of Allowance mailed Jan. 13, 2015 for Japanese Patent Application No. 20121518769.
Application filed Dec. 11, 2011 for U.S. Appl. No. 13/380,949.
Chinese Office Action dated Jan. 28, 2014 and Search Report dated Jan. 21, 2014 for Chinese Application No. 201080030935.4.
Search Report dated Apr. 24, 2010 for German Application No. 10 2009 032 399.6-51.
Application filed Oct. 24, 2013 for U.S. Appl. No. 14/113,649.
Response filed May 18, 2015 to Office Action dated Nov. 18, 2014 for U.S. Appl. No. 14/113,649.
Final Office Action dated Jul. 20, 2015 for U.S. Appl. No. 14/113,649.
German Search Report dated Mar. 25, 2014 for German Application No. 202013105779-7.
Application filed Nov. 16, 2012 for U.S. Appl. No. 13/698,417.
Application filed Jun. 2, 2013 for U.S. Appl. No. 13/991,285.
English translation of application filed Aug. 13, 2013 for Application filed Jun. 2, 2013 for U.S. Appl. No. 13/991,285.
Restriction Requirement dated May 27, 2015 for U.S. Appl. No. 13/991,285.
Application filed Jan. 29, 2015 for Design U.S. Appl. No. 29/516,073.
Application filed Jan. 29, 2015 for Design U.S. Appl. No. 29/516,082.
Application filed Mar. 3, 2015, 2015 for Design U.S. Appl. No. 29/519,198.
Response to Restriction Requirement filed Jul. 27, 2015 to Restriction Requirement dated May 27, 2015 for U.S. Appl. No. 13/991,285.
Application filed Jul. 31, 2015 for U.S. Appl. No. 14/815,210.
Final Office Action dated Aug. 4, 2015 for U.S. Appl. No. 13/380,949.
Notice of Allowance dated Aug. 3, 2015 for U.S. Appl. No. 29/486,232.
Office Action dated Aug. 7, 2015 for U.S. Appl. No. 13/991,285.
Response filed Dec. 21, 2015 to Office Action dated Jul. 20, 2015 for U.S. Appl. No. 14/113,649 (36).
Response filed Oct. 6, 2015 to Notice of Non-Compliant Amendment for U.S. Appl. No. 13/698,417.
Notice of Non-Compliant Amendment dated Aug. 10, 2015 for U.S. Appl. No. 13/698,417.
Final Office Action dated Oct. 16, 2015 for U.S. Appl. No. 13/698,417.
Extended European Search Report dated Apr. 17, 2015 for European Application No. 14004167.4.
Office Action dated Feb. 19, 2016 for U.S. Appl. No. 14/113,649.
Final Office Action dated Feb. 25, 2016 for U.S. Appl. No. 13/698,417.
Restriction Requirement dated Mar. 25, 2016 for Design U.S. Appl. No. 29/516,082.
Notice of Allowance dated Jan. 22, 2016 for U.S. Appl. No. 13/991,285.
Notice of Allowance dated Jan. 19, 2016 for Design U.S. Appl. No. 29/539,615.
Notice of Allowance dated Jan. 27, 2016 for Design U.S. Appl. No. 29/510,723.
Response to Office Action filed Feb. 16, 2016 for U.S. Appl. No. 13/698,417.
Screen shot of a SATA product (SATAjet B) description retrieved on Feb. 12, 2016 from www.sata.com/index.php.
"The Hot Rolling Process;" California Steel; retrieved on Feb. 12, 2016 from http://www.californiasteel.com/GetPublicFile.aspx?id=53.
Response restriction requirement filed May 23, 2015 for Design U.S. Appl. No. 29/516,082.
German Search Report dated Apr. 12, 2016 for related German Application No. 10 2015 008 735.5.
Response filed Apr. 27, 2016 to Office Action dated Jan. 29, 2016 for U.S. Appl. No. 13/380,949.

* cited by examiner

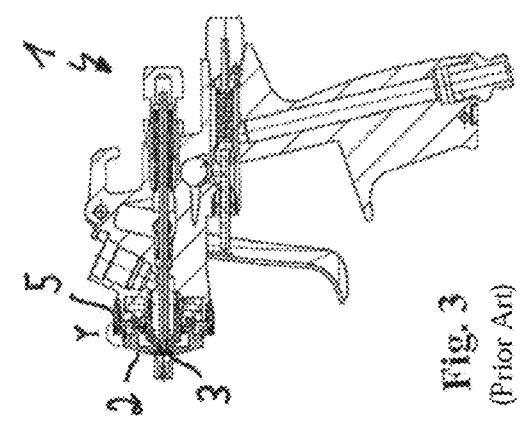
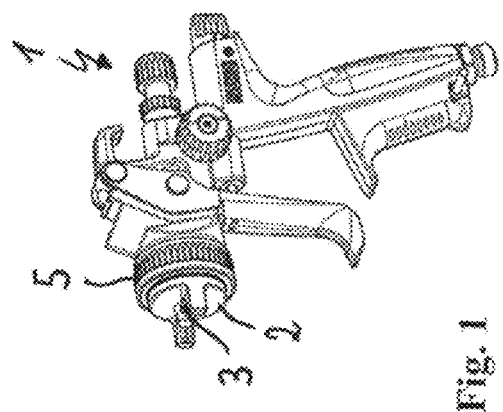
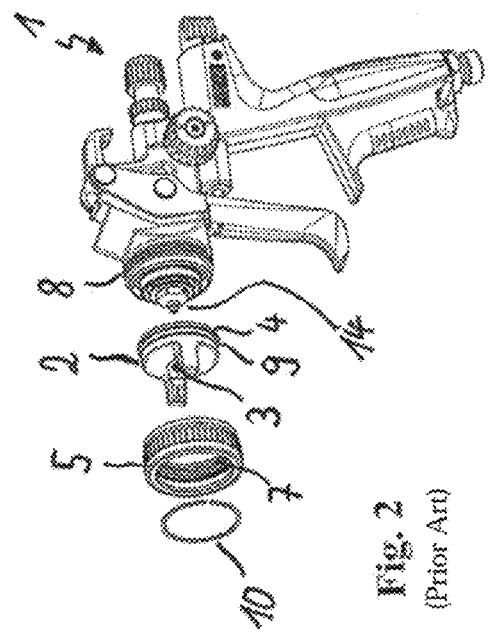
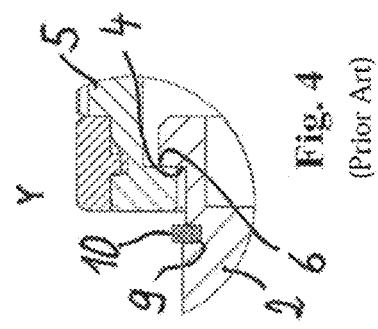

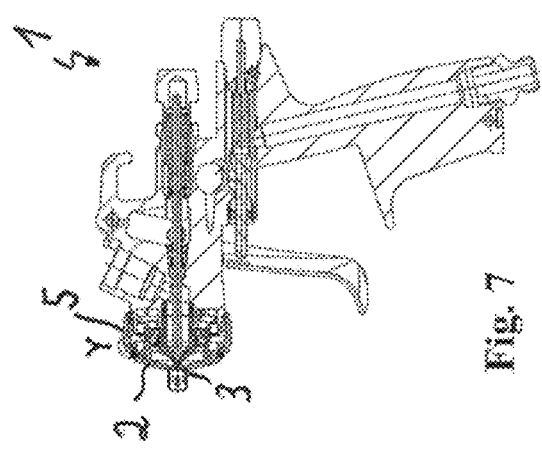
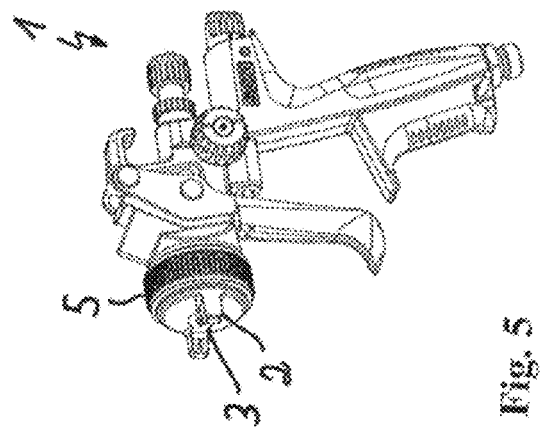
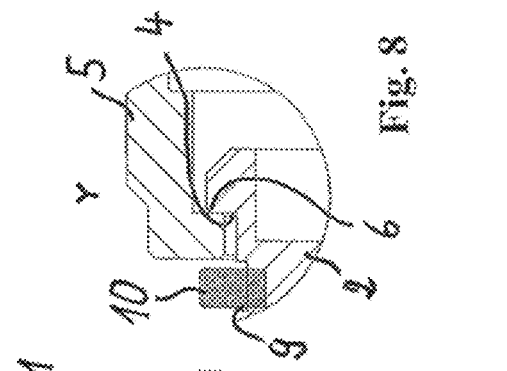
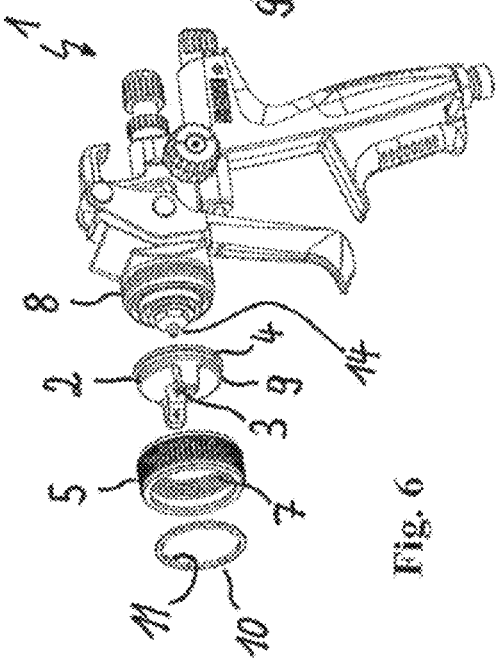

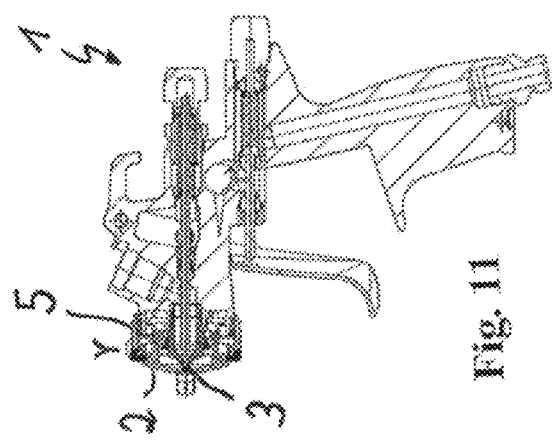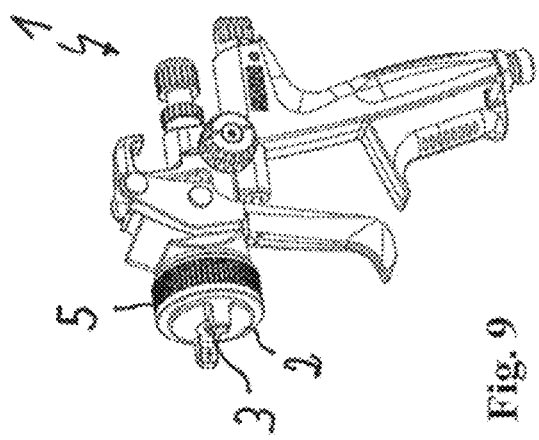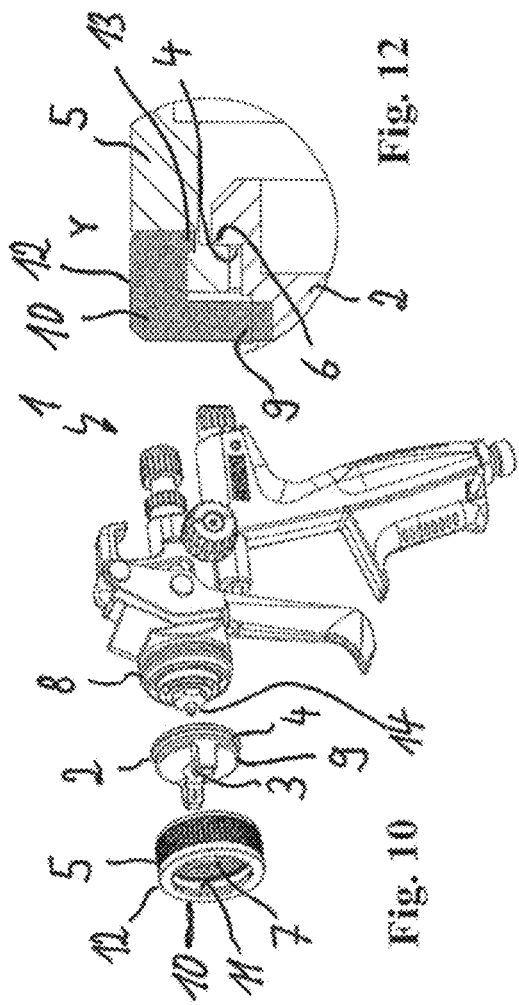

AIR NOZZLE CLOSURE FOR A SPRAY GUN

FIELD OF THE INVENTION

The invention concerns an air nozzle closure for a spray gun.

BACKGROUND OF THE INVENTION

In the area of varnishing and painting technology, so-called spray guns are used. These are devices that are supplied with both varnish or paint in liquid form as well as compressed air, and that distribute the varnish or the paint, with the addition of compressed air, in very small drops, the so-called spray jet with which the surface to be coated is covered. The addition of paint can, for example, take place with a paint hose, with so-called flow cups placed above, or with so-called siphon cups, suspended below. The paint is supplied from these cups or supply lines of a so-called paint nozzle, whose opening can be regulated by the user via a nozzle needle. The paint nozzle is surrounded by an air nozzle, which is designed as a ring nozzle and which is supplied with the compressed air. This leaves the ring nozzle at a high speed and thereby carries along the paint exiting from the paint nozzle, atomizes it, and in this way produces the fine spray jet. Such a varnishing or painting gun is the subject of EP 0710506 A1, whose disclosure content is made the subject of this description. The publication also shows, in FIG. 2, the precise structure of the paint nozzle and the ring nozzle, together with an air nozzle closure, which has an air cap.

With modern paint spray guns, the air nozzle closure is designed in such a way that it has an air cap, which has an axial borehole to hold the paint nozzle when screwed on, with the formation of an annular slot for the passage of exiting air and a first annular flange, directed radially outward. Furthermore, the air nozzle closure has an air nozzle ring surrounding the air cap, with a second annular flange directed radially inward and an inner thread for screwing on the air nozzle closure with an outer thread of the spray gun. The air cap, when screwed on, is snapped in, with annular flanges adjacent to one another, between the spray gun and the air nozzle ring. Furthermore, an annular groove with a locking ring is provided on the outside of the air cap; it locks the air nozzle ring against a loosening of the air cap when it is not screwed on wherein, therefore, the air nozzle ring is removed from the spray gun.

Such air nozzle closures have the disadvantage that the locking ring is hard to handle and thus, during the cleaning of the spray gun, it is hard to remove the air nozzle ring from the air cap.

SUMMARY OF THE INVENTION

One embodiment of the invention provides a more manageable and easier-to-clean air nozzle closure for a spray gun. Other embodiments are also disclosed.

If the locking ring has an elastic snapping element that projects inward to snap into the annular groove, it can be easily set and removed, so that a breakdown of the air nozzle closure can be carried out faster and more easily and thus the cleaning of the spray gun is facilitated.

The design of the locking ring as a continuous plastic ring with at least one elastic fastening lug projecting inward to snap into the annular groove is thereby particularly advantageous, since it can be removed and reset quickly and simply. Several surrounding fastening lugs can also be designed along the inside of the locking ring.

In order to make possibly an easy assembly and dismantling, the width of the annular groove should at least slightly exceed the thickness of the locking ring.

In another preferred embodiment, the width of the annular groove exceeds the thickness of the locking ring by approximately 20% or more, wherein the locking ring can be moved axially within the annular groove. The level of the locking ring can hereby be about three times the depth of the annular groove or more, wherein the locking ring can be clearly seen. The user can thus see at first glance that the air nozzle closure is secured with a locking ring, Moreover, with a suitable selection of color for this locking ring, a marking can be carried out at the same time, for example, an indication as to a certain spray gun or a spray gun with a specific nozzle size.

In another advantageous embodiment, the outside edge of the locking ring is designed so as to be enlarged axially in the direction of the air nozzle ring, and with this enlargement is firmly connected with the air nozzle ring. In this way, a particularly significant marking possibility is produced, in particular if the outside edge of the locking ring in the area of the air nozzle ring has an additional extension pointing radially inward and the air nozzle ring is connected with the locking ring in a tight fit, and if the locking ring has a surface that is optically different from the surface of the air nozzle ring and the air cap.

BRIEF DESCRIPTION OF THE DRAWINGS

An embodiment example of the invention is explained in more detail below, with reference to the accompanying drawings. The figures show the following:

FIG. 1, a perspective representation of an assembled spray gun according to the state of the art;

FIG. 2, the spray gun shown in FIG. 1, with the air nozzle closure shown in an exploded view;

FIG. 3, the spray gun shown in FIG. 1, in a longitudinal section;

FIG. 4, the detail Y shown in FIG. 3;

FIG. 5, a perspective representation of a first embodiment of a spray gun with an air nozzle closure in accordance with the invention;

FIG. 6, a representation of the spray gun in accordance with FIG. 5, with an exploded view of the air nozzle closure;

FIG. 7, the spray gun shown in FIG. 5, in a longitudinal section;

FIG. 8, the detail Y shown in FIG. 7;

FIG. 9, a perspective representation of a second embodiment of a spray gun in accordance with the invention;

FIG. 10, the spray gun in accordance with FIG. 9, with the air nozzle closure in an exploded view;

FIG. 11, the spray gun shown in FIG. 9, in a longitudinal section; and

FIG. 12, the detail Y designated in FIG. 11.

DETAILED DESCRIPTION

FIGS. 1-4 show a spray gun according to the state of the art, whereas FIGS. 5-8 show a first embodiment of a spray gun with an air nozzle closure in accordance with the invention, and FIGS. 9-12 show a second embodiment of a spray gun with an air nozzle closure in accordance with the invention.

In the following description, the details of a spray gun, which are, in fact, known, are not discussed, but rather the discussion deals only with its air nozzle closure, that is, first, the description of an air nozzle closure from the state of the art, in accordance with FIGS. 1-4. The air nozzle closure of a spray gun 1 shown there has an air nozzle ring 5, which can be screwed on an outside thread 8 of the spray gun. Within this air nozzle ring 5 and when screwed by this on the spray gun 1, there is an air cap 2 with an axial borehole 3 for the passage of exiting air during the operation of the spray gun 1. Within this axial borehole 3, there is the paint nozzle, which is not described and depicted in detail here and which is provided with the reference number 14 in the drawings. For the sake of completion, reference is made to the fact that the air exiting from the borehole 3 during the operation of the spray gun 1 draws out the paint exiting from the paint nozzle, produces a fine atomization, and thus creates the spray jet. In the example shown in FIGS. 1-4, according to the state of the art, the air cap 2 has, moreover, so-called lateral horns, which are not designated individually and which likewise have boreholes for the exiting of air, which, during the operation of the spray gun 1, serve to flatten the spray jet, which is, in fact, conical.

The air nozzle ring 5 has a second annular flange 6, which is directed radially inward, which works together with a first annular flange 4 of the air cap 2, directed radially outward. In the screwed-on state, as is depicted in detail in FIG. 4, this second annular flange 6 of the air nozzle ring 5 presses on the first annular flange 4 of the air cap 2 and thus presses the air cap 2 on the paint nozzle 14 when the air nozzle ring 5 is firmly screwed on the outside thread 8 of the spray gun 1. An automatic centering also takes place hereby, so that the air cap 2 lies right against the spray gun 1.

In order to prevent the unit consisting of the air nozzle ring 5 and air cap 2 from separating from one another in the unscrewed state of the air nozzle ring 5, the spray gun 1 has a locking ring 10 in accordance with the state of the art; it is fixed in an annular groove 9 of the air cap 2 and protrudes over the outside diameter of the air cap 2, so that the air nozzle ring 5 cannot fall off from the air cap 2, but rather is affixed by the locking ring 10. This locking ring can be an open snap-in ring made of spring steel.

In the first embodiment of the invention, in accordance with FIGS. 5-8, an air nozzle ring 5 is likewise provided, which presses a comparable air cap 2 against the spray gun 1 when it is screwed on the outside thread 8 of the spray gun 1. Furthermore, this embodiment has a locking ring 10, which likewise prevents the falling off of the air nozzle ring 5 from the air cap 2 in the unscrewed state. As can be seen from FIG. 6, this locking ring 10, however, has several elastic snap-in means, which protrude inward, in the shape of plastic lugs, since the entire locking ring 10 is made of plastic. In this way, the locking ring 10 can be brought into the position shown in FIG. 8 for every snap-in operation after the air nozzle ring 5 has been set on the air cap 2, and is affixed there by the fastening lugs 11 acting as snap-in means. As can be seen from FIG. 8, the locking ring 10 is equipped with a larger outside diameter, as is common in the state of the art according to FIGS. 1-4, wherein the level of the locking ring 10 in the embodiment example under consideration is approximately three times the depth of the annular groove 9 of the air cap 2. Moreover, the locking ring 10 advantageously differs in the area of its surface from the surface of the air nozzle ring 5 and the surface of the air cap 2.

In this way, a secure snapping-in of the locking ring 10 is made possible via the fastening lugs 11, and the locking ring 10 can simultaneously serve as a marking, for example, as a color ring, so as to distinguish different air nozzle closures or spray guns 1 from one another. In this respect, it fulfills a double function as a locking ring 10 and a marking ring.

With so-called HVLP guns, the locking ring 10 can be green and with so-called RP guns, it can be blue, and the surface of the air nozzle ring 5 can, for example, have a silver color. In every case, contrasting colors and/or patterns are selected for the locking ring and the air nozzle ring so that the presence of a locking ring can be recognized without any problem.

Another embodiment of this locking ring 10 is shown in FIGS. 9-12, wherein, in this case, the locking ring 10 has an outside edge 12, which is designed axially enlarged in the direction of the air nozzle ring 5 and, with this enlargement, is firmly connected with the air nozzle ring 5. Here, therefore, the air nozzle ring 5 and the air cap 2 form a unit, but in this way remain movable toward one another, so that the width of the annular groove 9 is larger than the width of the locking ring 10 in the area in which it engages in the annular groove. With this embodiment, the outside edge 12 of the locking ring 10, which can be seen well in FIG. 12, in the area of the air nozzle ring 5, has an additional extension 13 pointing radially inward, and the air nozzle ring 5 is connected with the locking ring 10 there in a tight fit. Thus, the locking ring 10 and the air nozzle ring 5 are rigidly connected with one another, and the locking ring 10 meshes, via the snap-in means or the fastening lug 11, in the annular groove 9 of the air cap 2.

With this embodiment also, the locking ring 10 advantageously has a surface that differs optically from the surface of the air nozzle ring 5 and the air cap 2, so that it can also be used, in addition to its function as the locking ring, as an optical identification, and thus fulfills a double function.

The locking ring 10 can be designed as a continuous or interrupted ring. It can be made of plastic or metal or another suitable, sufficiently elastic material. Material combinations are likewise conceivable with the locking ring 10; for example, metal/plastic in a type that the ring is made of a relatively nonelastic metal and has at least one elastic plastic nub or vice versa. It is essential that it is able, at least in areas, to enter into a locking connection, a snapping connection, a clamping connection, or the like, with the air nozzle ring 5.

The locking ring 10 can have only one elastic snap-in means, in the shape of a fastening lug 11, or a number of such fastening lugs 11, which are preferably situated at a distance to one another. In the embodiment example under consideration, the width of the annular groove 9 exceeds the thickness of the locking ring 10 by at least 20%, wherein the locking ring 10 can be moved axially within the annular groove 9 without any problems, which makes possible an exceedingly easy assembly and dismantling. On the other hand, a very slight, for example, 1% wider annular groove 9, or a very much, for example, 90% wider annular groove 9 makes possible a relatively good holding of the locking ring 10. Theoretically, there are no upper limits, except that there must still be material present to support the locking ring 10.

The level of the locking ring 10 must be at least twice to three times the depth of the annular groove 9 if the locking ring 10 is to simultaneously have a marking character.

What is claimed is:

1. Air nozzle closure for a spray gun with an air cap, which has at least one axial borehole for the passage of exiting air and a first annular flange, which is radially directed outward, and an air nozzle ring surrounding the air cap, with a second annular flange radially directed inward, and an inside thread for the screwing on of the air nozzle closure with an outside thread of the spray gun, wherein the air cap in the screwed state, with annular flanges adjacent to one another, is clamped in between the spray gun and the air nozzle ring, and a first annular groove with a locking ring, which secures the air nozzle ring in the unscrewed state against the loosening of the air cap, wherein the locking ring has at least one elastic snap-in means projecting inward to snap into the annular groove.

2. Air nozzle closure according to claim 1, wherein the locking ring is a continuous plastic ring.

3. Air nozzle closure according to claim 1, wherein the elastic snap-in means is at least one fastening lug projecting inward.

4. Air nozzle closure according to claim 3, wherein the fastening lug is a surrounding lug.

5. Air nozzle closure according to claim 3, wherein a plurality of fastening lugs are located at a distance from one another.

6. Air nozzle closure according to claim 1, wherein the width of the annular groove exceeds the thickness of the locking ring, wherein the locking ring can be moved axially within the annular groove, and the level of the locking ring is at least slightly greater than the depth of the annular groove.

7. Air nozzle closure according to claim 6, wherein the width of the annular groove exceeds the thickness of the locking ring by approximately 20%.

8. Air nozzle closure according to claim 5, wherein the level of the locking ring is approximately three times the depth of the annular groove.

9. Air nozzle closure according to claim 1, wherein the outside edge of the locking ring is designed axially enlarged in the direction of the air nozzle ring, and with this enlargement, is firmly connected with the air nozzle ring.

10. Air nozzle closure according to claim 1, wherein the outside edge of the locking ring in the range of the air nozzle ring has an additional extension pointing radially inward, and the air nozzle ring is connected with the locking ring in a tight fit.

11. Air nozzle closure according to claim 1, wherein the locking ring has a surface which is optically different from the surface of the air nozzle ring and the air cap.

* * * * *